No. 727,040. PATENTED MAY 5, 1903.
G. WESTINGHOUSE.
AUTOMATIC FLUID PRESSURE BRAKE APPARATUS.
APPLICATION FILED AUG. 1, 1900.
NO MODEL. 4 SHEETS—SHEET 1.

WITNESSES:
Jas. B. Macdonald

INVENTOR
George Westinghouse
by T. J. Hogan, Att'y.

No. 727,040. PATENTED MAY 5, 1903.
G. WESTINGHOUSE.
AUTOMATIC FLUID PRESSURE BRAKE APPARATUS.
APPLICATION FILED AUG. 1, 1900.
NO MODEL. 4 SHEETS—SHEET 4.

WITNESSES:
Jas. B. MacDonald
J. C. Custer

INVENTOR,
George Westinghouse,
by T. J. Hogan, Att'y.

No. 727,040. Patented May 5, 1903.

UNITED STATES PATENT OFFICE.

GEORGE WESTINGHOUSE, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

AUTOMATIC FLUID-PRESSURE BRAKE APPARATUS.

SPECIFICATION forming part of Letters Patent No. 727,040, dated May 5, 1903.

Application filed August 1, 1900. Serial No. 25,540. (No model.)

*To all whom it may concern:*

Be it known that I, GEORGE WESTINGHOUSE, a citizen of the United States, residing in Pittsburg, county of Allegheny, State of Pennsylvania, have invented or discovered a certain new and useful Improvement in Automatic Fluid-Pressure Brake Apparatus, of which improvement the following is a specification.

The object of my invention is to provide an improvement in automatic fluid-pressure brake apparatus; and to this end it consists in new and improved means for controlling the passage through the section of train-pipe on a car and its connection with the branch pipe or passage leading to the triple valve device.

Figure 1:
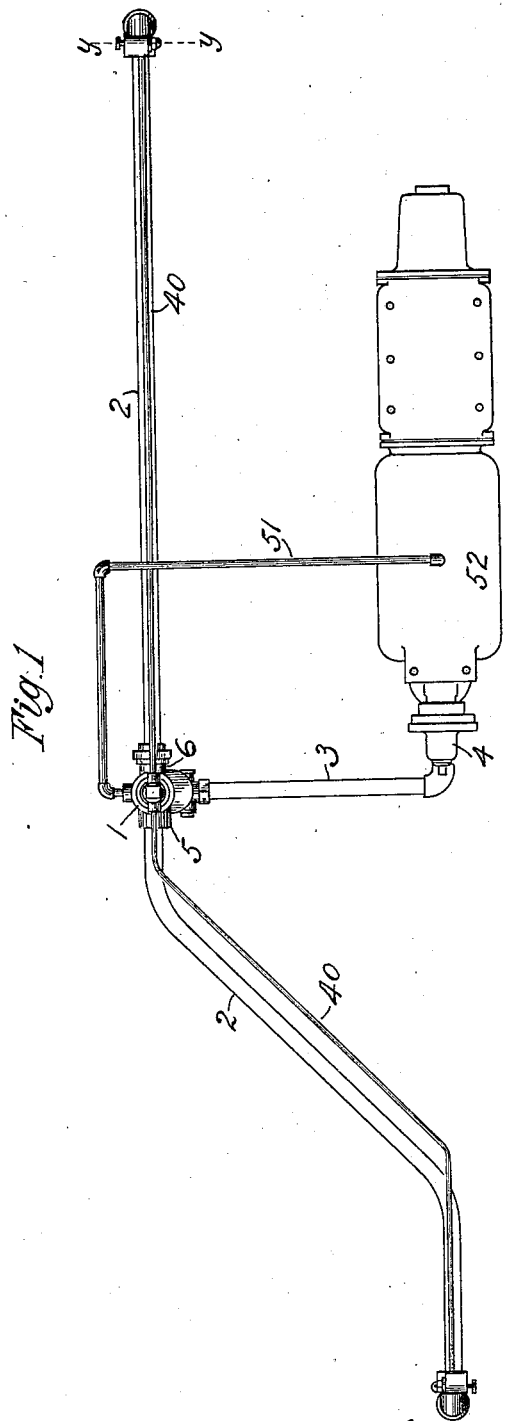
Figure 2:
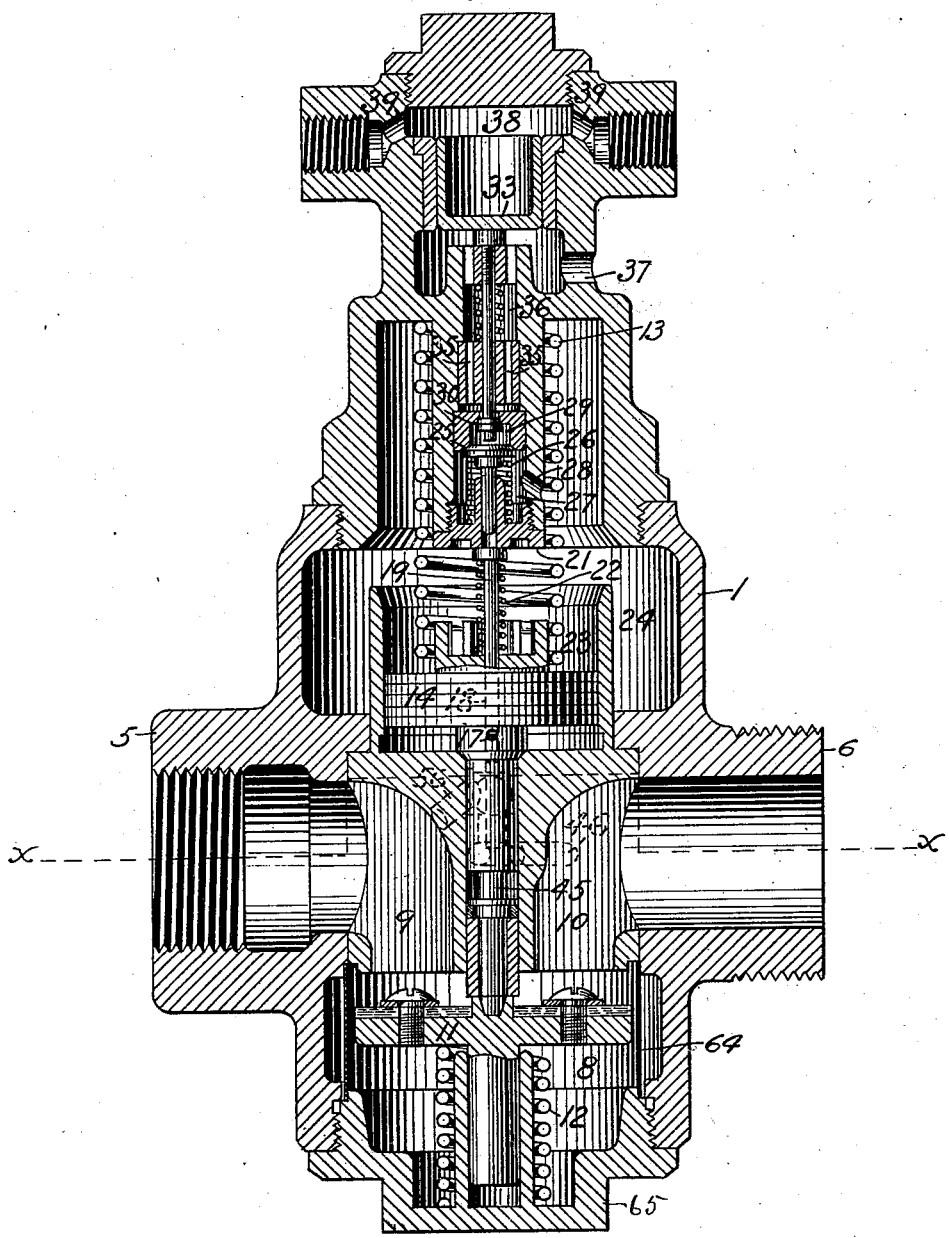
Figure 3:
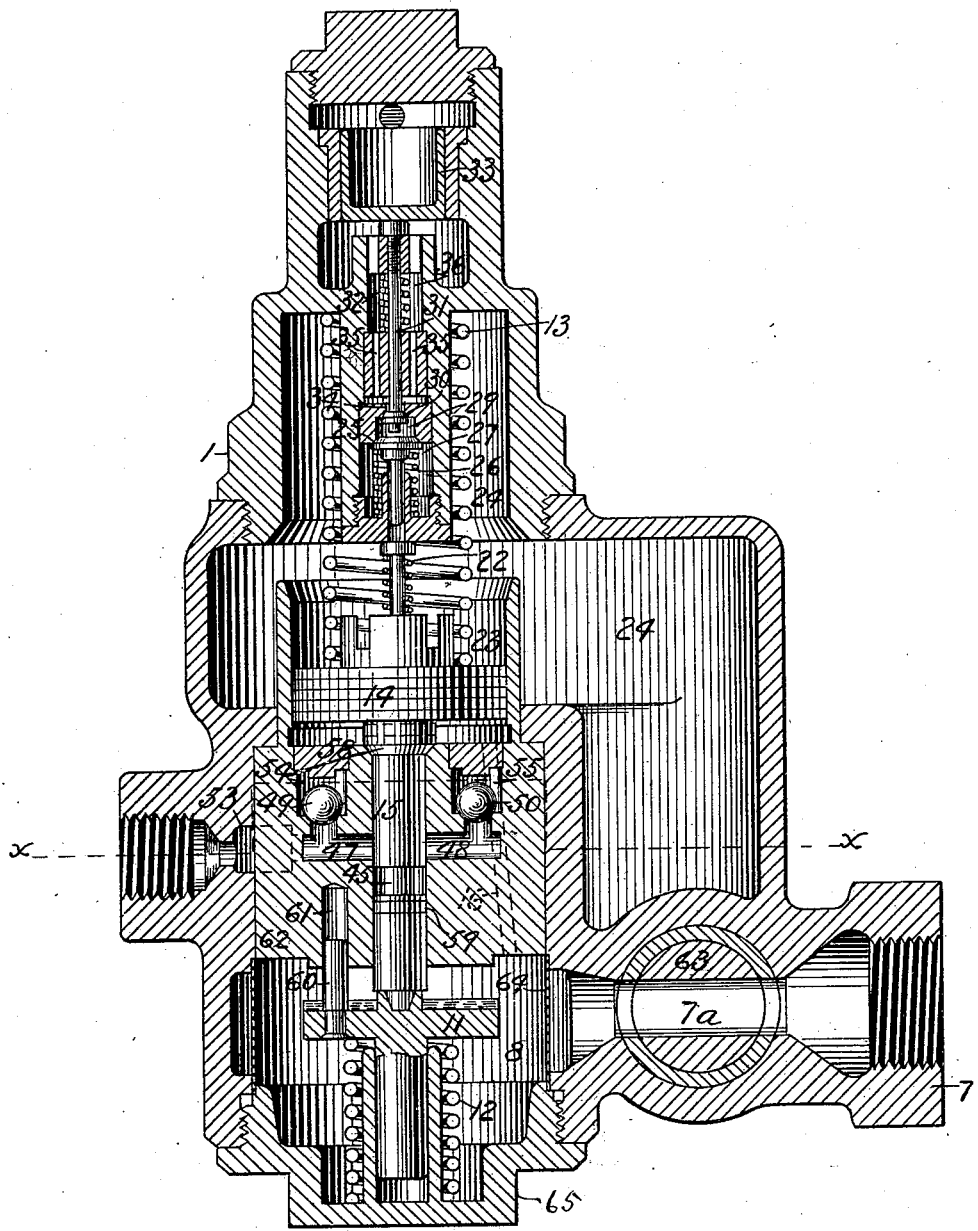
Figure 4:
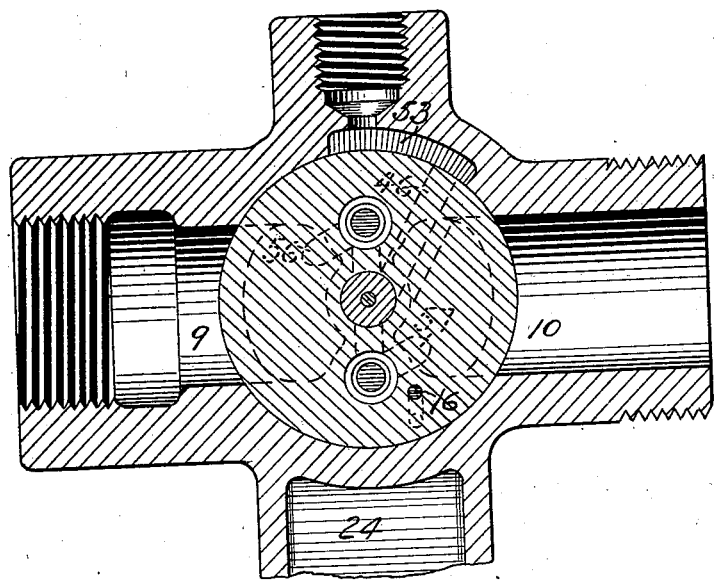
Figure 5:
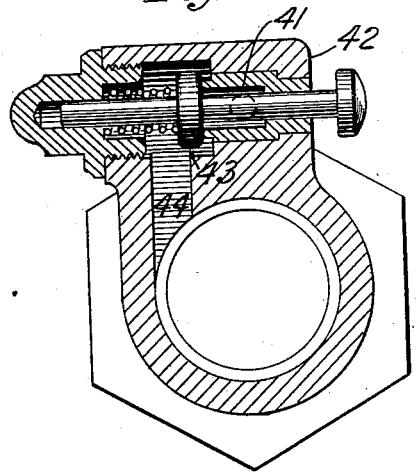
Figure 6:
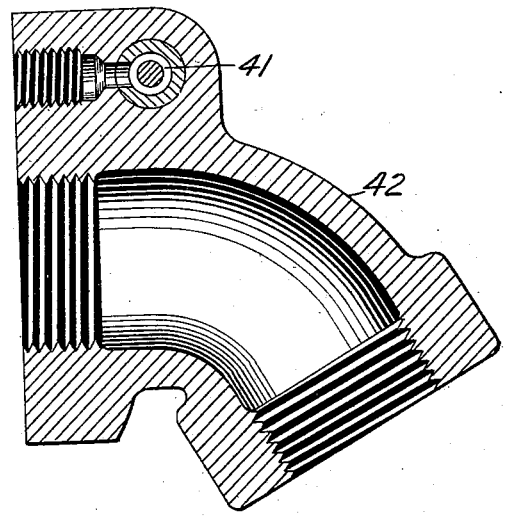

In the accompanying drawings, which illustrate an application of my invention, Figure 1 is a plan view showing an auxiliary reservoir, a brake-cylinder, and a section of train-pipe with my improvement applied thereto; Fig. 2, a vertical section through my improved valve device in the plane of the center line of the train-pipe; Fig. 3, a vertical section of the same device in a plane at right angles to that of Fig. 2; Fig. 4, a horizontal section on the line *x x* of Figs. 2 and 3, a part of the casing being broken away; Fig. 5, a section on the line *y y* of Fig. 1, and Fig. 6 a section in a plane at right angles to that of Fig. 5.

My invention provides means whereby the angle-cocks near each end of a car in the section of train-pipe may be dispensed with and whereby the hose-couplings connecting two sections of train-pipe may be separated while the train-pipe is charged with air without applying the brakes or permitting the escape of any considerable quantity of air.

In accordance with my invention I provide a valve device 1, which is located in the train-pipe 2, preferably at a point convenient for connection with the branch pipe 3 from the triple valve device 4. The valve device 1 is connected to the train-pipe by means of the nozzles 5 and 6 and to the branch pipe from the triple valve by means of the nozzle 7, the passage through which opens into the chamber 8 below the passages 9 and 10, connecting with the two portions of the train-pipe leading to opposite ends of the car. A valve 11 in the chamber 8 controls the ports 9 and 10 and is acted on by a spring 12, tending to close it, the form and dimensions of the valve 11 being such that it covers both of the ports 9 and 10 when seated, and in order to prevent turning of the valve a pin 60 is secured thereto, which moves in a hole 61 in the plug 62. The pressure of the spring 12 is resisted and normally overbalanced by the pressure of a stronger spring 13, which bears at one end on the fixed casing and at the other end on a movable abutment or piston 14, the stem 15 of which is normally in contact with the valve 11. When the train-pipe is charged with fluid under pressure, the piston 14 is normally exposed on its opposite sides to the same degree of pressure as that existing in the train-pipe, fluid from the chamber 8 being supplied to the lower side of the piston through the passage 16 and to the upper side of the piston through the transverse passage 17 in the piston-stem and the passage 18 in the piston, in which passage 18 is loosely fitted the small spring-pressed rod 19. The rod 19 is held up against the nut 21 by the spring 22, and as the piston 14 moves up and down the rod 19 serves to prevent clogging of the passage and at the same time to limit its capacity for the flow of fluid therethrough.

The chamber 23 above the piston 14 and the space 24 with which the chamber 23 is in open communication are normally closed to the atmosphere by a valve 25, which is held seated by a spring 26 and by the pressure of the fluid in the chambers 24 and 27, the chamber 27 being in communication with the chamber 24 through the passage 28. (Shown in Fig. 2 of the drawings.) The chamber 29 above the valve 25 is closed on its upper side by a small valve 30 on the lower end of a spring-pressed rod 31, which is held up by a spring 32 and which supports a hollow piston 33. When the valves 25 and 30 are open, the chambers 23, 24, and 27 are in communication with the atmosphere through the chamber 29, passages 34, 35, and 36, and port 37.

The chamber 38 above the hollow piston 33 is connected, by means of passages 39 and pipes 40, with the chambers 41 in the angle-fittings 42 at each end of the rigid section of train-pipe, and a small valve 43 in each of the angle-fittings controls communication between the interior of the train-pipe and the pipes 40.

When the train-pipe is being charged with fluid under pressure, the rear end of the train-pipe should be closed by means of a dummy coupling, and the fluid charged into the pipe flows through the passages 9 and 10 from one portion of the pipe to the other and through the chamber 8, passage 7ª, and branch pipe 3 to the triple valve. From the chamber 8 the fluid flows through the passage 16 to the under side of the piston 14 and thence through the passages 17 and 18 into the chambers 23 and 24, and the piston 14, being exposed to the same degree of fluid-pressure on its opposite sides, will be held down by the spring 13 and the valve 11 will be held open.

If it is desired to uncouple any two sections of train-pipe or to couple the section on the rear car with another section, the valve 11 should first be closed, and this may be effected by pushing open the valve 43 by hand, so as to admit fluid under pressure from the train-pipe through the passage 44, chamber 41, and pipe 40 to the upper side of the hollow piston 33. The fluid under pressure, acting on the piston 33, will force the piston and the rod 31 downward far enough to unseat the valves 25 and 30 and permit the fluid under pressure above the piston 14 to escape to the atmosphere through the passages 35, 36, and 37, and the pressure below the piston 14, assisted by the spring 12, will overcome the resistance of the spring 13, and the valve 11 will then close the passages 9 and 10. The valves 25 and 30 will remain open until the pressure above the hollow piston 33 has become sufficiently reduced by leakage to the atmosphere to permit the closing of the valves 25 and 30 by the springs 26 and 32, and during the time these valves are open the sections of flexible hose on two adjacent cars in a train may be uncoupled and dummy couplings applied thereto for closing the end of the train-pipe, or the dummy coupling may be uncoupled from the end of the train-pipe of the rear car in a train and a connection made with another car which is to be added to the train.

The portion 45 of the piston-stem 15 is smaller in diameter than the parts above and below it, and this construction provides an annular space around the stem which in a certain position of the stem serves as a connecting-passage between a passage 46, communicating with the auxiliary reservoir, and the passages 47 and 48 below the ball-valves 49 and 50. (Shown in Fig. 3 of the drawings.) A pipe 51 (shown in Fig. 1) connects the auxiliary reservoir 52 with a passage 53 in the valve-casing, and air from the auxiliary reservoir is supplied through pipe 51 and passage 53 to the passages 46, 47, and 48. The chamber 54, in which is located the ball-valve 49, communicates with the train-pipe passage 9 by means of a passage 56, (shown in dotted lines in Figs. 2 and 4,) and the chamber 55, above the ball-valve 50, communicates with the train-pipe passage 10 through a passage 57, so that when the train-pipe is charged with fluid under pressure the ball-valves are held to their seats by train-pipe pressure and are exposed over a smaller area on their lower sides to auxiliary-reservoir pressure in the passages 47 and 48. When the piston 14 is in its lowest position, the passage in which the piston-stem 15 is located is closed at its upper end by the valve 58, formed on the stem 15, and a packing-ring 59 on the stem, just below the reduced portion 45, prevents leakage of reservoir-air to the train-pipe. When by the movement of the hollow piston 33 the valves 30 and 25 are unseated and the pressure is thereby released from the chambers 23 and 24, the piston 14, the stem of which only abuts against the valve 11 and is not otherwise connected thereto, will move upward to the limit of its stroke, in which position the packing-ring 59 on the piston-stem 15 will be at the upper side of the passages 47 and 48, the reduced portion 45 of the piston-stem will be above those passages, and release of air from the auxiliary reservoir through the passages 53, 46, 47, and 48 will be prevented. When the train-pipe is opened at one end of the car either by separating two half-sections of a coupling or by removing a dummy coupling, the fluid under pressure in the portion of the train-pipe between the valve 11 and the disconnected end will be partly or wholly exhausted to the atmosphere, and when the end of the train-pipe is again closed by a dummy coupling or connected with a pipe on another car the pressure will be restored in that portion of the train-pipe by the automatic operation of the piston 14 and its stem 15, which will move downward as the chamber above the piston 14 is replenished through the passages 17 and 18 after the closing of the valves 25 and 30. In its downward movement the stem 15 will again come in contact with the valve 11 and will be checked in its movement in such a position as to connect the passage 46 with the passages 47 and 48 through the annular space surrounding the reduced portion 45 of the stem, and fluid under pressure will then flow from the auxiliary reservoir through the pipe 51 and passages 53 and 46 into the passages 47 and 48, from which it will flow after unseating one of the ball-valves through passage 56 or 57 into the portion of the train-pipe from which the fluid under pressure had been released. The increase of pressure above the piston 14 and above the valve 11 in the portion of pipe which is being recharged will then permit the spring 13 to move the piston 14 farther downward and unseat the valve 11 and again establish a continuous passage through the train-pipe.

A cut-out cock 63 is located in the casing of the valve device 1 in position to control the passage 7ª, through which fluid under pressure is supplied to the triple valve device.

The chamber 8, in which the valve 11 is located, is surrounded by a strainer 64, which is held in place by a screw-plug 65 and which may be easily and quickly removed for cleaning or renewal.

I claim as my invention and desire to secure by Letters Patent—

1. A valve device operative by variations of fluid-pressure for controlling the passage of fluid through the section of train-pipe on a car independently of variations of train-pipe pressure.

2. The combination, with a train-pipe under or on a car, of a branch therefrom to a triple valve device, and a valve device operative by variations of fluid-pressure for controlling communication between the train-pipe and the triple valve device independently of variations of train-pipe pressure.

3. The combination, with a train-pipe under or on a car, of a branch pipe therefrom to a triple valve device, and a valve device operative by variations of fluid-pressure for controlling communication through the train-pipe and between the train-pipe and the triple valve device.

4. The combination, with a train-pipe under or on a car, of a valve device for controlling the passage of fluid through the train-pipe, a movable abutment or piston for controlling the operation of the valve device, and a manually-operated valve device for supplying fluid under pressure to the movable abutment or piston.

5. The combination, with a train-pipe, of a valve for controlling the passage of fluid therethrough, a movable abutment or piston for holding the valve open, which is normally exposed to fluid under pressure, and means for releasing fluid under pressure from one side of the abutment or piston to permit the closing of the valve independently of variations of train-pipe pressure.

6. The combination, with a train-pipe, of a valve for controlling the passage of fluid therethrough, a movable abutment or piston normally exposed on its opposite sides to fluid under pressure, a spring for holding the movable abutment or piston in position to open the valve, and means for releasing fluid under pressure from one side of the movable abutment or piston to permit the closing of the valve independently of variations of train-pipe pressure.

7. The combination, with a train-pipe, of a valve for controlling the passage of fluid therethrough, a spring for closing the valve, a movable abutment or piston normally exposed on its opposite sides to fluid under pressure, a spring for acting on the movable abutment or piston to hold the valve open, and a valve for releasing fluid under pressure from one side of the movable abutment or piston to permit the closing of the valve.

8. The combination, with a train-pipe, of a valve for controlling the passage of fluid therethrough, a spring for closing the valve, a movable abutment or piston normally exposed on its opposite sides to fluid under pressure, a spring for acting on the movable abutment or piston to hold the valve open, a release-valve for releasing fluid under pressure from one side of the movable abutment or piston and means for operating the release-valve by the action of fluid under pressure.

9. In an automatic fluid-pressure brake apparatus, the combination, with a train-pipe, of a valve device operative by variations of fluid-pressure for controlling the passage of fluid through the train-pipe, and means for charging the train-pipe with fluid under pressure from an auxiliary reservoir.

10. In an automatic fluid-pressure brake apparatus, the combination, with a train-pipe, of a valve for controlling the passage of fluid therethrough, a spring for closing the valve, a movable abutment or piston, a spring for acting on the movable abutment or piston to hold the valve open, a release-valve for releasing fluid under pressure from one side of the movable abutment or piston and a piston actuated by pressure from the train-pipe to open the release-valve.

11. In an automatic fluid-pressure brake apparatus, the combination, with a train-pipe, of a main valve device for controlling the passage of fluid therethrough, and a valve device outside of the main valve device for releasing fluid under pressure from the train-pipe to a movable abutment or piston for operating the main valve device.

12. In an automatic fluid-pressure brake apparatus, the combination, with a train-pipe, of a main valve device for controlling the passage of fluid through the train-pipe and between the train-pipe and a triple valve device, a pipe connecting the main valve device with the train-pipe near the end of a car, and a valve for admitting fluid under pressure from the train-pipe to the main valve device to close the passage through the train-pipe.

13. In an automatic fluid-pressure brake apparatus, the combination, with a train-pipe, of a valve-casing located at the junction of the triple-valve connection with the train-pipe, a chamber in the casing, passages connecting the train-pipe with the chamber, a valve controlling the passages from the train-pipe, a passage connecting the chamber with the triple valve device, and a strainer between the train-pipe passages and the passage to the triple valve device.

14. In an automatic fluid-pressure brake apparatus, the combination, with a train-pipe of a valve-casing, a chamber in the casing, a valve in the chamber controlling passages to the train-pipe, a passage connecting the chamber with a triple valve device, a perforated partition or strainer in the chamber, surrounding the valve and located between the passages to the train-pipe and the passage to the triple valve device, and a screw-plug for holding the strainer in place.

In testimony whereof I have hereunto set my hand.

GEO. WESTINGHOUSE.

Witnesses:
R. F. EMERY,
JAS. B. MACDONALD.